United States Patent
Terada et al.

(10) Patent No.: US 9,483,425 B2
(45) Date of Patent: Nov. 1, 2016

(54) MEMORY INCLUDING A BAND WIDTH CONVERSION UNIT, MEMORY SYSTEM AND MEMORY CONTROL METHOD USING THE SAME

(71) Applicant: Sony Corporation, Tokyo (JP)

(72) Inventors: Haruhiko Terada, Kanagawa (JP); Lui Sakai, Kanagawa (JP); Naohiro Adachi, Tokyo (JP)

(73) Assignee: Sony Corporation, Tokyo (JP)

( * ) Notice: Subject to any disclaimer, the term of this patent is extended or adjusted under 35 U.S.C. 154(b) by 71 days.

(21) Appl. No.: 14/459,966

(22) Filed: Aug. 14, 2014

(65) Prior Publication Data

US 2015/0074314 A1 Mar. 12, 2015

(30) Foreign Application Priority Data

Sep. 9, 2013 (JP) ................................ 2013-185893

(51) Int. Cl.
G06F 13/12 (2006.01)
G06F 13/16 (2006.01)
G06F 13/28 (2006.01)

(52) U.S. Cl.
CPC ......... *G06F 13/1678* (2013.01); *G06F 13/287* (2013.01); *G06F 13/16* (2013.01); *G06F 13/1668* (2013.01); *G06F 13/28* (2013.01)

(58) Field of Classification Search
CPC ............. G06F 13/1678; G06F 13/287; G06F 13/1668; G06F 13/16; G06F 13/28
See application file for complete search history.

(56) References Cited

U.S. PATENT DOCUMENTS

| | | | | |
|---|---|---|---|---|
| 5,317,715 A | * | 5/1994 | Johnson | G06F 13/4013 703/25 |
| 5,337,409 A | * | 8/1994 | Sakata | H04N 1/00283 345/501 |
| 5,613,078 A | * | 3/1997 | Kishigami | G06F 13/1678 710/307 |
| 5,928,339 A | * | 7/1999 | Nishikawa | G06F 13/28 710/23 |
| 6,301,184 B1 | * | 10/2001 | Sasaki | G11C 7/1045 365/226 |
| 6,567,908 B1 | * | 5/2003 | Furuhashi | G06F 13/28 711/1 |
| 2005/0080953 A1 | * | 4/2005 | Oner | G06F 13/4018 710/52 |
| 2005/0182885 A1 | * | 8/2005 | Matsui | G06F 13/4018 710/307 |
| 2006/0161698 A1 | * | 7/2006 | Shen | G06F 13/1678 710/52 |
| 2007/0005831 A1 | * | 1/2007 | Gregorius | G06F 13/4243 710/52 |
| 2007/0121389 A1 | * | 5/2007 | Wu | G11C 5/04 365/189.05 |
| 2008/0040438 A1 | * | 2/2008 | Gan | G06Q 10/04 709/206 |
| 2008/0262760 A1 | * | 10/2008 | Sakurai | G06F 13/4045 702/58 |
| 2013/0019044 A1 | * | 1/2013 | Kaiwa | G06F 13/4059 710/307 |
| 2013/0262786 A1 | * | 10/2013 | Takashima | G06F 12/00 711/147 |

FOREIGN PATENT DOCUMENTS

| | | | | |
|---|---|---|---|---|
| CN | 104021097 A | * | 9/2014 | ............. G06F 13/28 |
| JP | GB 2280765 A | * | 2/1995 | ......... G06F 12/0284 |
| JP | 2000222347 A | * | 8/2000 | |
| JP | 2007-080484 | | 3/2007 | |
| JP | 2007164415 A | * | 6/2007 | |

* cited by examiner

*Primary Examiner* — Jing-Yih Shyu
(74) *Attorney, Agent, or Firm* — K&L Gates LLP

(57) ABSTRACT

A memory includes a buffer which retains data, a band conversion unit converts a band of an internal data bus that is used for data transfer between the band conversion unit and the buffer which retains data into a band wider than that of an external data bus that is used for data transfer between the band conversion unit and a memory controller, and an access control unit controls access to a memory cell using the buffer, during a wait time occurring in the internal data bus due to a difference between the band of the internal data bus and the band of the external data bus.

9 Claims, 15 Drawing Sheets

MEMORY INCLUDING A BAND WIDTH
CONVERSION UNIT, MEMORY SYSTEM
AND MEMORY CONTROL METHOD USING
THE SAME

CROSS REFERENCES TO RELATED APPLICATIONS

The present application claims priority to Japanese Priority Patent Application JP2013-185893 filed in the Japan Patent Office on Sep. 9, 2013, the entire content of which is hereby incorporated by reference.

BACKGROUND

The present disclosure relates to a memory, a memory system, and a memory control method, and specifically, to a memory including a buffer, a memory system, and a memory control method.

In the related art, a memory has been used for an information processing system as an auxiliary storage device or storage. Generally, the memory includes memory cells or buffers. For example, a memory which temporarily retains write data or read data in a page buffer by a page unit has been proposed (for example, Japanese Unexamined Patent Application Publication No. 2007-80484).

The memory receives the write data from a memory controller via an external data bus DQ in synchronization with a predetermined input clock, and transfers the write data to the page buffer via an internal data bus CD_DATA in synchronization with the input clock to be retained there. Then, the memory writes the retained write data by accessing the memory cells. In addition, the memory reads read data from the memory cells and retains in the page buffer, and transfers the read data to the memory controller via the internal data bus and the external data bus.

SUMMARY

However, in the related art described above, it is difficult to improve transfer efficiency of data between a memory controller and a memory. When the above-described memory accesses memory cells using a page buffer, valid data for a buffer is difficult to be transferred via an internal data bus CD_DATA connected to the page buffer being used, and a wait time occurs. In addition, data is transferred by the same clock as that of the internal data bus CD_DATA on an external data bus DQ, and thus, at the time of accessing the memory cells, the wait time also occurs in the external data bus DQ. Due to this, even when a plurality of data are read or written continuously, there is a problem that the transfer efficiency of the data is decreased in the memory system. For example, it is assumed that the wait time of one cycle per 10 cycles will occur. In this case, even if a transferable band of external data bus is one Gbps (Giga bit per second), the memory can transfer data in only 900 Mbps (Mega bit per second).

In the present application, it is desirable to improve transfer efficiency of data in a memory system.

According to an embodiment of the present disclosure, there is provided a memory including: a buffer which retains data; a band conversion unit which converts a band of an internal data bus that is used for data transfer between the band conversion unit and the buffer into a band wider than that of an external data bus that is used for data transfer between the band conversion unit and a memory controller; and an access control unit which controls access to a memory cell using the buffer, during a wait time occurring in the internal data bus due to a difference between the band of the internal data bus and the band of the external data bus, and a control method thereof. As a result, there is an effect that access to the memory cell is controlled during the wait time occurring in the internal data bus.

In the embodiment of the present disclosure, a data bus may be used as the internal data bus and the external data bus, and the band conversion unit may convert a bus width of the data bus which is used as the internal data bus into a value wider than that of a bus width of the data bus which is used as the external data bus. As a result, there is an effect that the bus width of the data bus which is used as the internal data bus is converted into a value wider than the bus width of the data bus which is used as the external data bus.

In the embodiment of the present disclosure, the band conversion unit may convert a transfer clock of the data on the internal data bus into a clock faster than a transfer clock of the data on the external data bus. As a result, there is an effect that the transfer clock of the data on the internal data bus is converted into a clock faster than the transfer clock of the data on the external data bus.

In the embodiment of the present disclosure, the memory further includes a data conversion unit which mutually converts data that is serially transferred on the external data bus and data that is transferred in parallel on the external data bus, the memory controller may serially transfer data to the data conversion unit, and the band conversion unit may transfer data in parallel to the data conversion unit. As a result, there is an effect that the data which is serially transferred and the data which is transferred in parallel are mutually converted.

According to another embodiment of the present disclosure is a memory system including: a memory controller; a buffer which retains data; a band conversion unit which converts a band of an internal data bus that is used for data transfer between the band conversion unit and the buffer into a band wider than that of an external data bus that is used for data transfer between the band conversion unit and the memory controller; and an access control unit which controls access to a memory cell using the buffer, during a wait time occurring in the internal data bus due to a difference between the band of the internal data bus and the band of the external data bus. As a result, there is an effect that access to the memory cell is controlled during the wait time occurring in the internal data bus.

According to the embodiments of the present disclosure, there is a remarkable effect that transfer efficiency of data can be improved in a memory system. In addition, the effects described herein are not limited, and may be one of the effects described in the present disclosure.

Additional features and advantages are described herein, and will be apparent from the following Detailed Description and the figures.

DETAILED DESCRIPTION

Hereinafter, forms (hereinafter, referred to as embodiments) for performing the present disclosure will be described. Description will be made in the following sequence.

1. First Embodiment (example in which a bus width of an internal data bus becomes wider than that of an external data bus)

2. Second Embodiment (example in which a transfer clock of the internal data bus becomes faster than that of the external data bus)

1. First Embodiment

Configuration Example of Information Processing System

Figure 1:
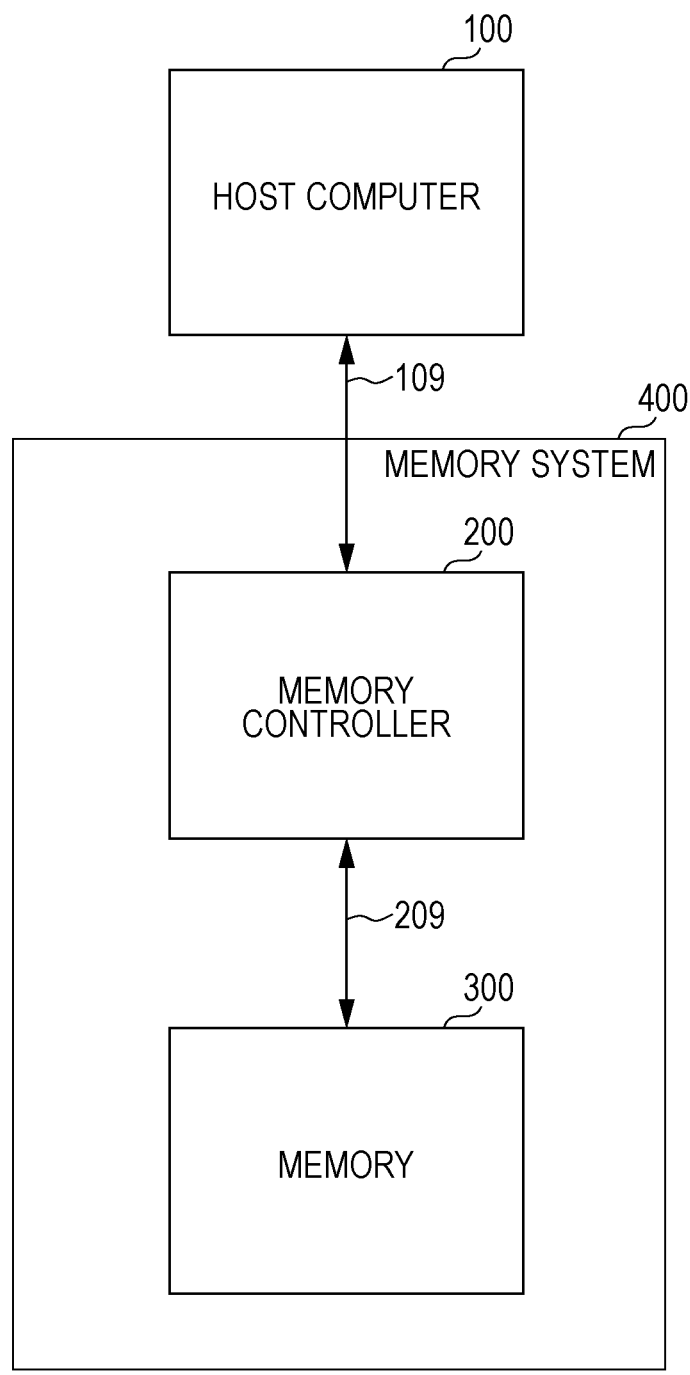
FIG. 1 is a block diagram illustrating one configuration example of an information processing system according to a first embodiment.

FIG. 1 is a block diagram illustrating one configuration example of an information processing system according to an embodiment. The information processing system includes a host computer 100 and a memory system 400. The memory system 400 includes a memory controller 200 and a memory 300.

The host computer 100 controls the memory system 400. The host computer 100 performs writing or reading of data by controlling the memory system 400.

The memory controller 200 controls the memory 300. The memory controller 200 supplies the memory 300 with commands via a signal line 209, according to a control of the host computer 100. The commands generated by the memory controller 200 will be described in detail later.

In addition, the memory controller 200 transfers the data in parallel which is serially transferred from the host computer 100 to the memory 300, and serially transfers the data which is transferred in parallel from the memory 300 to the host computer 100.

In addition, the memory controller 200 receives an address to be accessed from the host computer 100, divides the address into a row address and a column address, and supplies the divided addresses to the memory 300. The row address is an address which is assigned to a row formed of memory cells arranged in a constant direction, in the memory 300 in which the memory cells are arranged in a two-dimensional lattice shape. The column address is an address which is assigned to a column formed of memory cells arranged in a direction perpendicular to the row.

In addition, in a case where the memory 300 includes a plurality of banks, the memory controller 200 generates a bank selection signal which selects any one of the banks, and supplies the signal to the memory 300.

The memory 300 stores data according to a control of the memory controller 200. The memory 300 receives a command, an address (row address and column address), and data from the memory controller 200. The memory 300 includes the memory cells, and writes the data to a memory cell designated by the address according to the command. In addition, the memory 300 reads the data from the memory cell designated by the address according to the command, and supplies the read data to the memory controller 200 via the signal line 209.

Configuration Example of Memory

Figure 2:
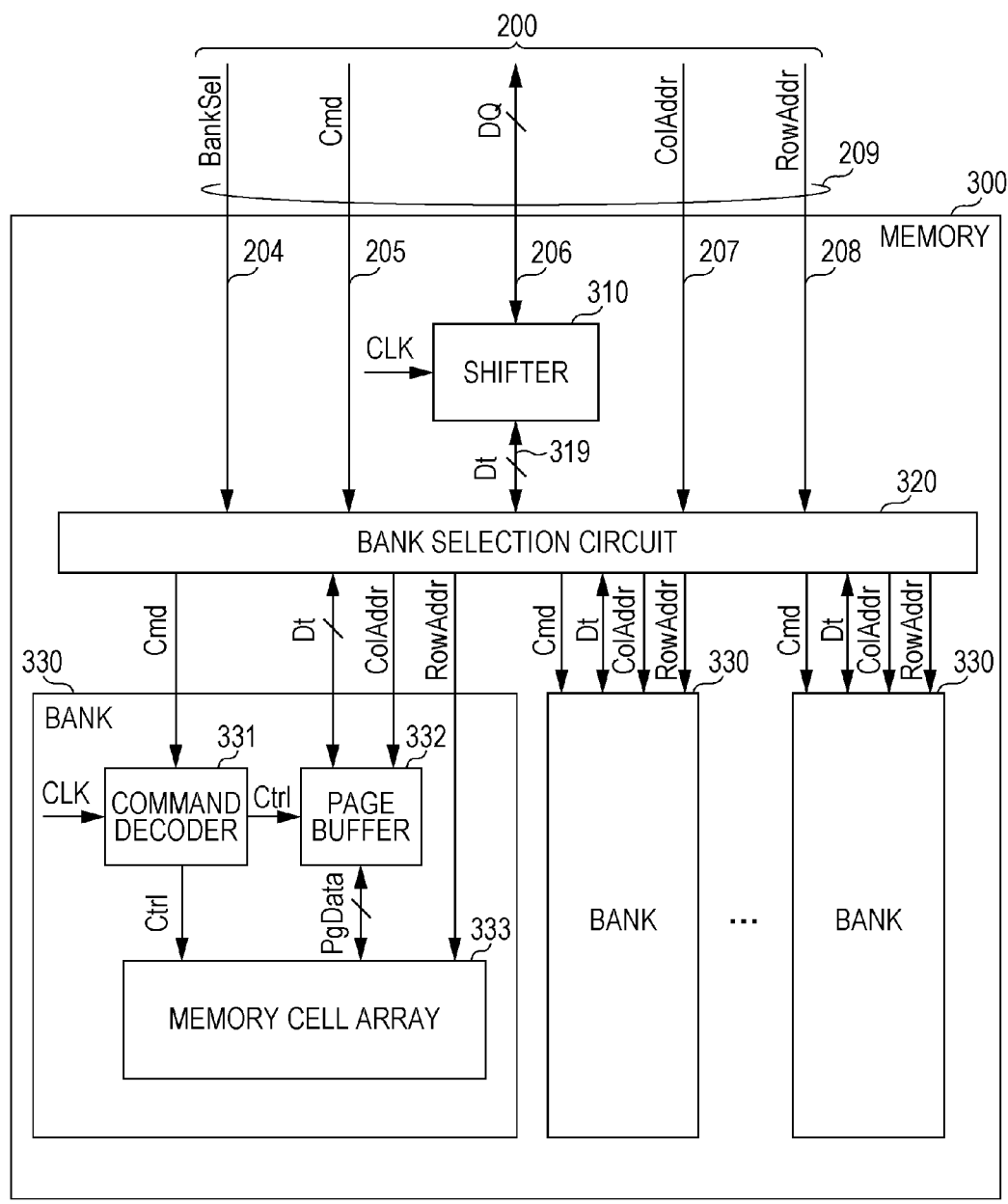
FIG. 2 is a block diagram illustrating one configuration example of a memory according to a first embodiment.

FIG. 2 is a block diagram illustrating one configuration example of the memory 300 according to the first embodiment. The memory 300 includes a shifter 310, a bank selection circuit 320, and L (L is an integer equal to or more than one) banks 330. The signal line 209 includes a signal line 204, a command line 205, an external data bus 206, an address line 207, and an address line 208.

The bank selection signal BankSel is transferred via the signal line 204, and a command Cmd is transferred via the command line 205. In addition, the data is transferred via the external data bus 206. A column address ColAddr and a row address RowAddr are transferred via the address lines 207 and 208. Among these, the signal line 204, the command line 205, the address line 207, and the address line 208 are connected to the bank selection circuit 320, and the external data bus 206 is connected to the shifter 310. In addition, the shifter 310 is connected to the bank selection circuit 320 via the internal data bus 319. In addition, the external data bus 206 is an example of the external data bus described in the scope of claims, and the internal data bus 319 is an example of the internal data bus described in the scope of claims.

The shifter 310 converts a bus width of the external data bus 206 into a value with a width wider than a bus width of the internal data bus 319. Here, the bus width of the external data bus 206 is, for example, N (N is an integer) bits. In contrast, the bus width of the internal data bus 319 is, for example, N+r (r is an integer) bits. The shifter 310 mutually converts data DQ of N bits which are transferred via the external data bus 206 and data Dt of N+r bits which are transferred via the internal data bus 319, in synchronization with a clock CLK. By this conversion, a band width of the internal data bus 319 becomes wider than a band width of the external data bus 206. In addition, the shifter 310 is an example of a band width conversion unit described in the scope of claims.

The bank selection circuit 320 selects a bank, and supplies an address, a command, and data to the selected bank. The bank selection circuit 320 selects the bank 330 indicated by the bank selection signal BankSel, and supplies the address and the command to the selected bank. In addition, the bank selection circuit 320 receives write data from the shifter 310, supplies the received write data to the selected bank, receives read data from the selected bank, and supplies the received read data to the shifter 310.

The bank 330 is a management unit when the memory controller 200 manages the memory 300. Each of the banks 330 includes a command decoder 331, a page buffer 332, and a memory cell array 333.

The memory cell array 333 includes a plurality of memory cells arranged in a two-dimensional lattice shape. An access unit of the memory cell array 333 is, for example, (N+r)×M bits. Here, M is an integer, and data of the access unit is referred to as page data.

In addition, a driver and a sense amplifier are connected to the memory cell array 333. The sense amplifier and the driver are not illustrated in FIG. 2. According to a control of the command decoder 331, the driver writes page data PgData from the page buffer 332 to a row designated by the row address RowAddr. In addition, according to a control of the command decoder 331, the sense amplifier reads the page data PgData from the row designated by the row address RowAddr, and supplies the read page data PgData to the page buffer 332.

The page buffer 332 retains data. The page buffer 332 can retain at least the data of (N+r)×M bits (amount of one page), and is realized by, for example, an SRAM (Static Random Access Memory) or the like. In the page buffer 332, M areas, each being mapped by the column address ColAddr, are provided. In each area, the data of N+r bits is retained. According to the control of the command decoder 331, the page buffer 332 retains data in an area corresponding to the designated column address ColAddr. In addition, according to the control of the command decoder 331, the page buffer 332 supplies the retained data to the bank selection circuit 320 or the memory cell array 333.

In addition, the page buffer 332 is realized by an SRAM, but is not limited to such a configuration. The page buffer 332 can be realized by a circuit, except for the SRAM, such as a flip-flop or a latch, if it is a circuit in which data is retained. In addition, in the page buffer 332, a circuit which retains the read data and a circuit which retains the write data may be configured by one circuit, and may be configured by a different circuit. In a case where the read data and the write data are retained in one circuit, the command decoder 331 switches the retained data using a control signal Ctrl.

In addition, the memory 300 may retain the read data in a sense amplifier. In this case, in the page buffer 332, only the write data is retained.

In addition, the page buffer 332 is an example of the buffer described in the scope of claims.

The command decoder 331 interprets and implements the command Cmd. The command Cmd includes, for example, data-in DI, a program PG, sense SE, and data-out DO.

The data-in DI is a command instructing retention of the write data in the page buffer 332. The program PG is a command instructing writing of the write data retained in the page buffer 332 to the memory cell.

In addition, the sense SE is a command instructing reading of the read data stored in the memory cell and retention of the read data in the page buffer 332. The data-out DO is a command instructing transfer of the read data retained in the page buffer 332 to the memory controller 200.

The command decoder 331, based on these commands, controls the page buffer 332 and the memory cell array 333 using the control signal Ctrl. Specifically, in a case where the command Cmd is the data-in DI, the command decoder 331 retains the data from the bank selection circuit 320 by controlling the page buffer 332. In addition, in a case where the command Cmd is the program PG, the command decoder 331 outputs the page data PgData (write data) by controlling the page buffer 332. In addition, the command decoder 331 writes the page data PgData output from the page buffer 332 to the memory cell array 333 by controlling the driver.

In a case where the command Cmd is the sense SE, the command decoder 331 reads the page data PgData (read data) from the memory cell array 333 by controlling the sense amplifier. In addition, the command decoder 331 retains the read page data PgData by controlling the page buffer 332.

In a case where the command Cmd is the data-out DO, the command decoder 331 supplies the retained data to the bank selection circuit 320 by controlling the page buffer 332.

Here, in a case where a plurality of page data are continuously transferred via the internal data bus 319, since the bus width of the internal data bus 319 is wider than the bus width of the external data bus 206, wait time of data occurs in the internal data bus 319.

Specifically, the bus width (N bits) of the external data bus 206 is 64 bits, and the bus width (N+r bits) of the internal data bus 319 is 66 bits. In addition, the access unit ((N+r)×M bits) of the memory cell array 333 is 66×32 bits.

Since 66×32 is equal to 64×33, the shifter 310 mutually converts 33 pieces of data of 64 bits DQ and 32 pieces of data of 66 bits Dt, in synchronization with the clock CLK. Through the conversion, each time the data of pieces corresponding to the access time (page) is converted, a wait time corresponding to one clock occurs in the internal data bus 319.

During the wait time, the command decoder 331, based on the program PG or the sense SE, controls access to the memory cell using the page buffer 332. In addition, the command decoder 331 is an example of an access control unit described in the scope of claims.

Figure 3:
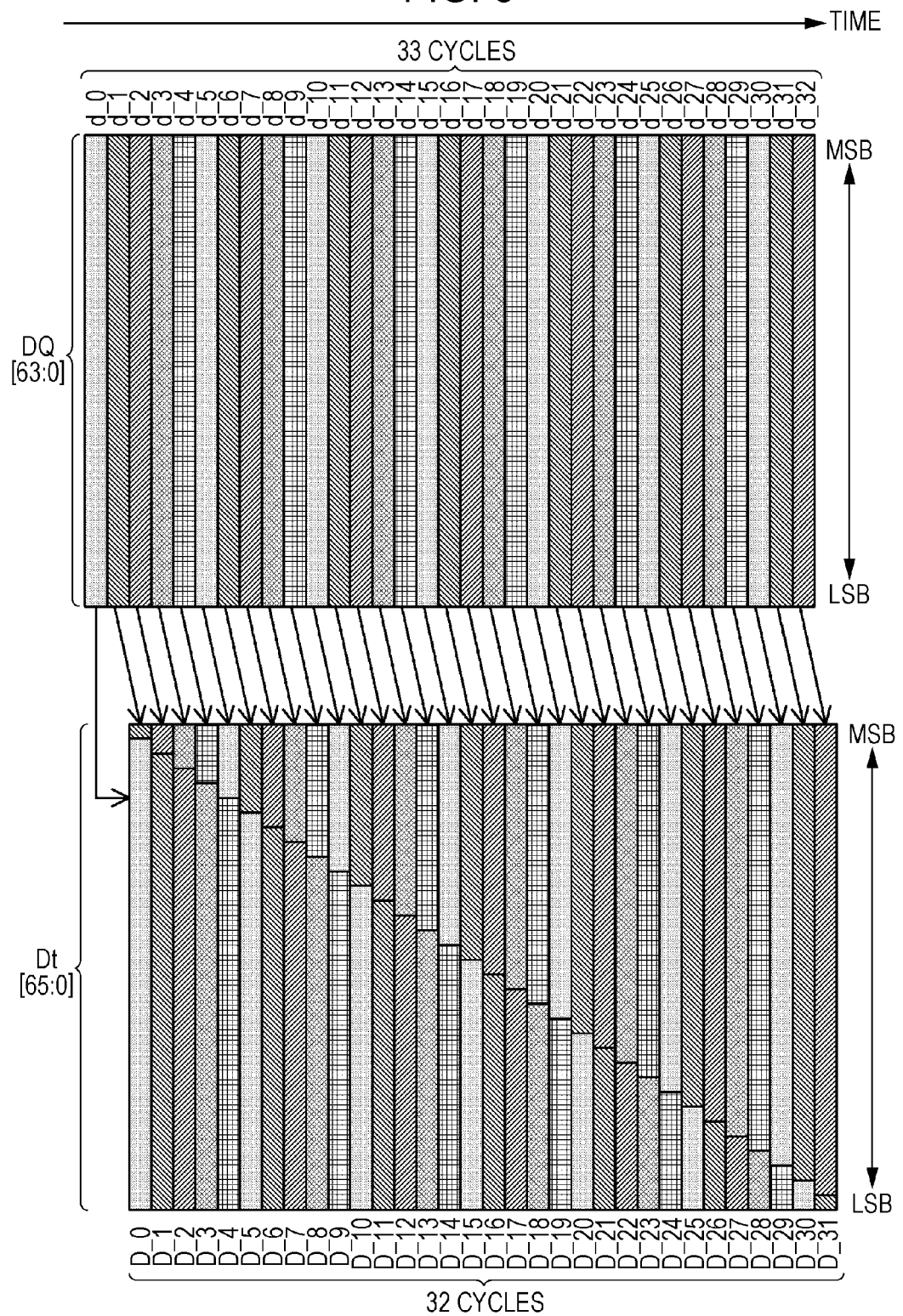
FIG. 3 is one example of write data which is transferred via an internal data bus and an external data bus according to a first embodiment.

FIG. 3 is one example of the write data which is transferred via the internal data bus and the external data bus according to the first embodiment.

As the write data DQ, 33 pieces of data of 64 bits d_0 to d_32 are transferred sequentially from the memory controller 200 to the memory 300 in synchronization with the clock CLK. The transfer of the 33 pieces of data is completed in 33 clock cycles.

The shifter 310 included in the memory 300 generates the data of 66 bits D_0 from the data d_0 and the data d_1 in a state of being delayed by two bits from the timing in which the data d_0 is supplied. The data D_0 is configured with all bits of the data d_0 and two bits of the data d_1. For example, the data d_1 is divided into the two most significant bits and the other bits, and the two most significant bits are inserted into the two least significant bits of the data D_0.

Then, the shifter 310 generates the data of 66 bits D_1 from the data d_1 and the data d_2. The data D_1 is configured with 62 bits of the data d_1 and four bits of the data d_2. Similarly, the shifter 310 divides the data d_2 to d_32 by shifting a division position by two bits and thus the data D_2 to D_31 are generated. As a result, during 32 clock cycles, 32 pieces of data of 66 bits Dt are generated.

In addition, a conversion method of the write data illustrated in FIG. 3 is an example of a conversion method in a case where a combination of the bus widths of the external data bus 206 and the internal data bus 319 is 64 bits and 66 bits. In a case where each bus width is different from the other, the shifter 310 may perform the conversion using a different conversion method depending on the bus width.

Operation Example of Memory

Figure 4:
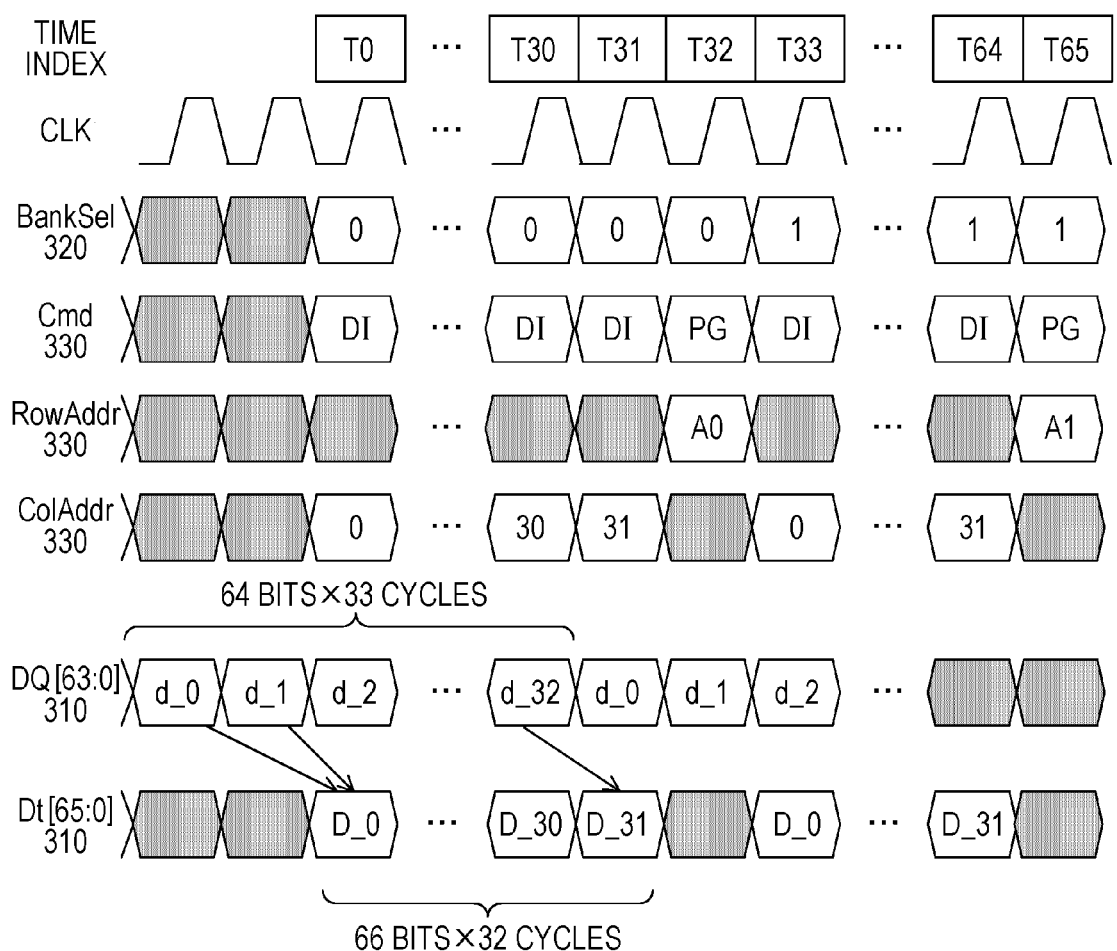
FIG. 4 is a timing chart illustrating one example of write processing according to a first embodiment.

FIG. 4 is a timing chart illustrating one example of write processing according to the first embodiment. In the present figure, Time Index is a value representing elapse of time, and each time the clock CLK ticks once, Time Index increases by one.

During the period of Time Index "T0" to "T32", if the bank selection signal BankSel "0" is input, the bank selection circuit 320 selects a "0"th bank 330.

In addition, during the period of Time Index "T0" to "T31", the data-in DI is input to the selected bank 330 as the command Cmd, and as the column addresses ColAddr, "0" to "31" are sequentially input to the selected bank 330.

On the other hand, during the period from two clocks before Time Index "T0" to Time Index "T30", the data of 64 bits d_0 to d_32 are sequentially input to the shifter 310. During the period of Time Index "T0" to "T31", the shifter 310 generates the data of 66 bits D_0 to D_31 from the data d_0 to d_32.

The bank 330 retains the data D_0 to D_31 in the page buffer 332. As a result, in Time Index "T31", data corresponding to one page is retained in the page buffer 332. If the data corresponding to one page is retained, the shifter 310 provides the wait time corresponding to one clock. During the wait time, the internal data bus 319 is in a state of don't-care in which valid data is not transferred.

During Time Index "T32" corresponding to the wait time, the program PG and the row address RowAddr "A0" are input to the bank 330. The bank 330 writes the page data retained in the page buffer 332 to the address designated by the memory cell array 333.

Here, in general, writing of the page data to the memory cell array 333 takes longer than the writing of the data of the data-in DI to the page buffer 332 for once. Due to this, after the program PG is generated, time equal to or more than one clock cycle is taken until a new command is generated in the same bank 330. Thus, the memory 300 includes a plurality of banks 330, and until the writing to one bank 330 is completed, generation of the data-in DI in another bank 330 is performed, and thus, a delay time taken for the writing is hidden. For example, after Time Index "T33", the bank selection signal BankSel "1" is input. As a result, throughput of the memory 300 is improved.

After Time Index "T31", the data to the bank 330 corresponding to the bank selection signal BankSel "1" to be selected later is input to the shifter 310. Thus, valid data is transferred to the external data bus 206, even in Time Index "T32" in which the internal data bus 319 is don't-care.

In this way, a band width of the internal data bus 319 is set to be wider than a band width of the external data bus 206, and thereby it is possible to hide the wait time necessary to implement the program PG so as not to be viewed from a memory controller 200 side.

Figure 5:
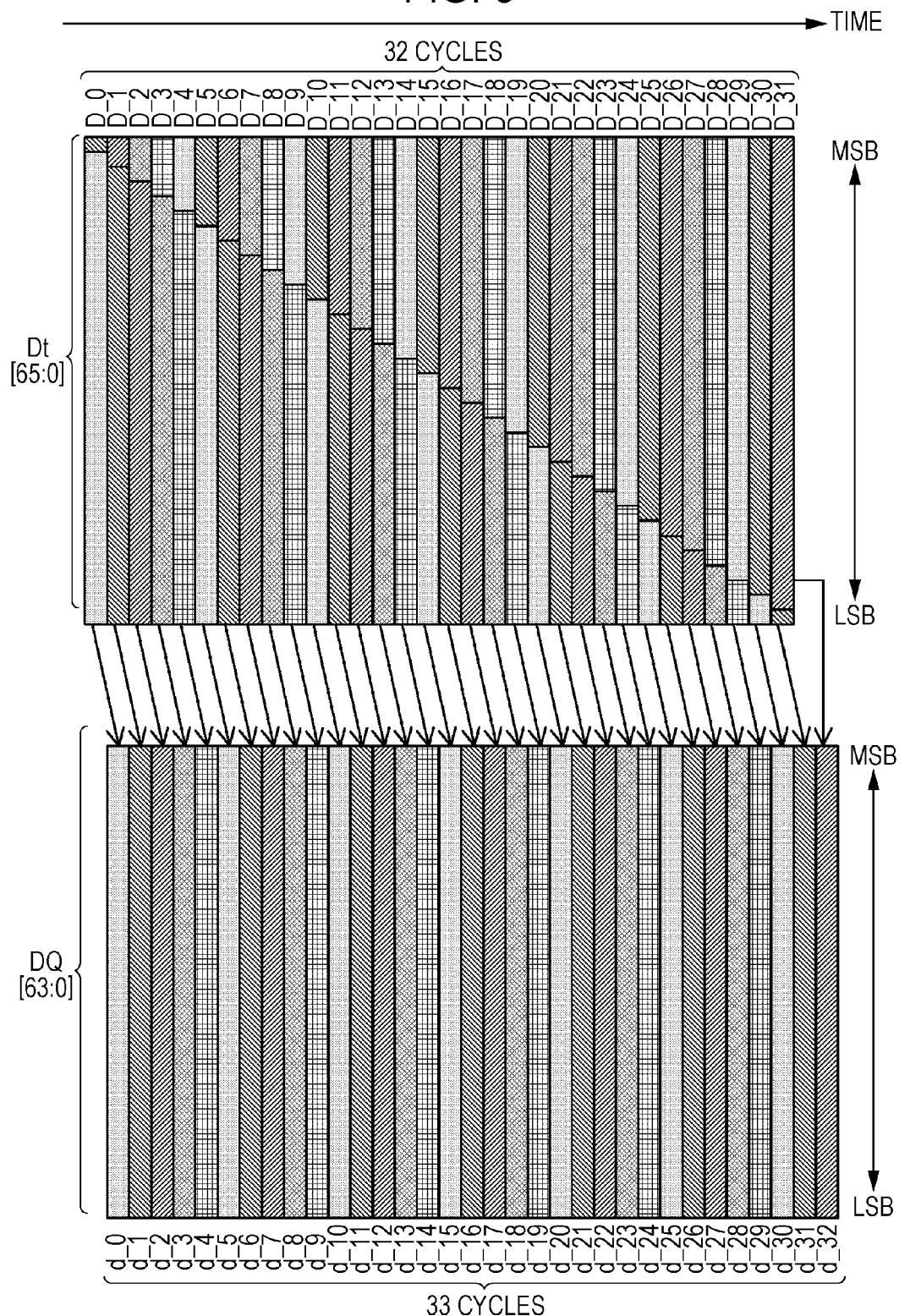
FIG. 5 is one example of read data which is transferred via an internal data bus and an external data bus according to a first embodiment.

FIG. 5 is one example of read data which is transferred via the internal data bus and the external data bus according to the first embodiment.

As the data Dt which is read, 32 pieces of data of 66 bits D_0 to D_31 are sequentially transferred from the bank 330 to the shifter 310 in synchronization with the clock signal. The transferring of the 32 pieces of data is completed by 32 clocks.

The shifter 310 generates the data of 64 bits d_0 from the data D_0 by delaying one clock from the timing in which the data D_0 is transferred. The data d_0 is data in which 64 bits are obtained by dividing the data of 66 bits D_0.

Then, the shifter 310 generates the data of 64 bits d_1 from the data D_0 and the data D_1. The data d_1 is configured with two bits of the data D_0, and 62 bits of the data D_1. Similarly, the shifter 310 divides the data D_1 to D_30 by shifting a division position by two bits and thus the data d_2 to d_31 are generated. Two bits of the last data D_31 are inserted into the data d_31, and the remained 64 bits become the data d_32 by the shifter 310. Thus, during 33 clock cycles, 33 pieces of data of 64 bits DQ are generated.

Figure 6:
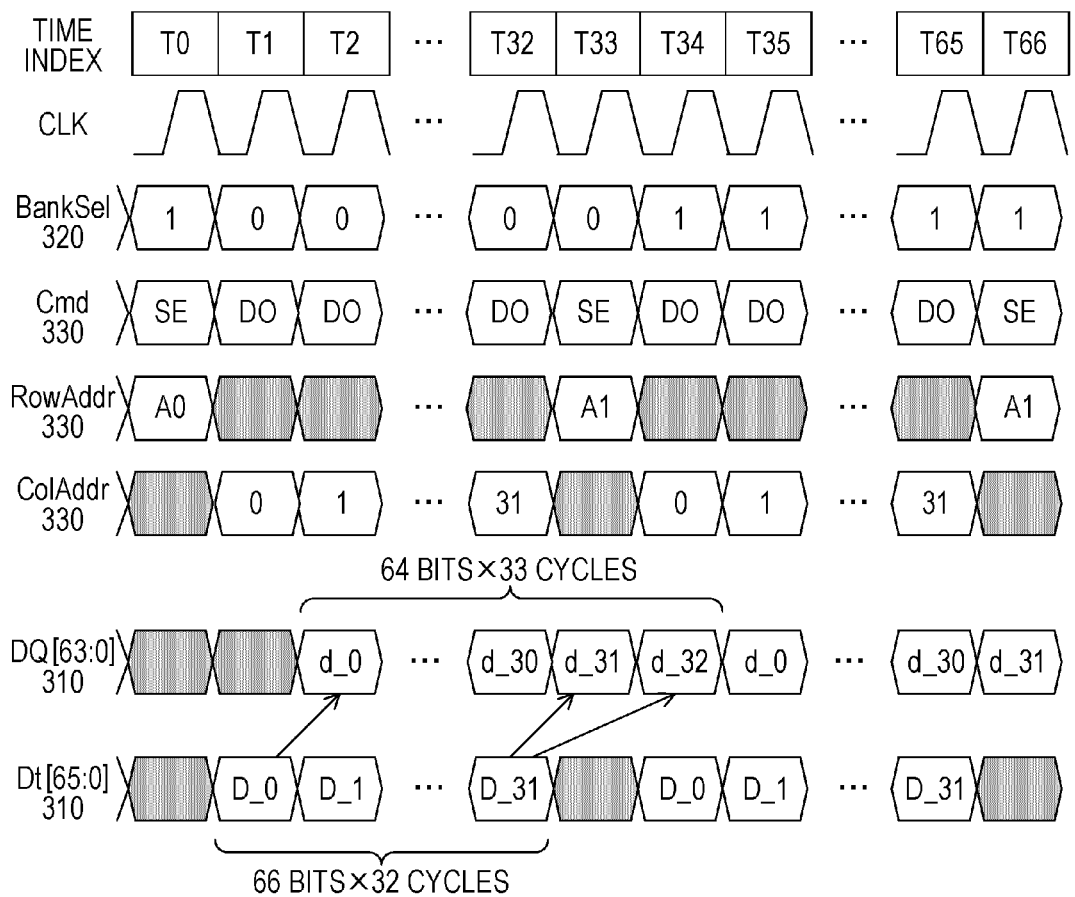
FIG. 6 is a timing chart illustrating one example of read processing according to a first embodiment.

FIG. 6 is a timing chart illustrating one example of read processing according to the first embodiment. If the bank selection signal BankSel "0" is input during the period of Time Index "T1" to "T34", the bank selection circuit 320 selects a "0"th bank 330.

In addition, during Time Index "T0", the sense SE is input to the bank 330 as the command Cmd. Then, during the period of Time Index "T1" to "T32", the data-out DO is input as the command Cmd, and "0" to "31" are sequentially input as the column address ColAddr.

In addition, during the period of Time Index "T1" to "T32", the data of 66 bits D_0 to D_31 which are read from the memory cells are sequentially input to the shifter 310. During the period of Time Index "T2" to "T34", the shifter 310 generates the data of 64 bits d_0 to d_32 from the data D_0 to D_31.

During Time Index "T32", the bank 330 completes the transferring of the data corresponding to one page to the shifter 310. If the transferring of the data corresponding to one page is completed, the shifter 310 provides the wait time corresponding to one clock. During the wait time, the internal data bus 319 is in a state of don't-care in which valid data is not transferred.

Since the band width of the external data bus 206 is narrower than that of the internal data bus 319, the valid data is transferred on the external data bus 206, even during the period when the internal data bus 319 is in a state of don't-care.

In this way, the band width of the internal data bus 319 is set to be wider than that of the external data bus 206, even in the read processing, and thereby it is possible to hide the wait time necessary to implement the sense SE so as not to be viewed from the memory controller 200 side. As a result, the transfer efficiency of data between the memory controller 200 and the memory 300 is improved.

Figure 7:
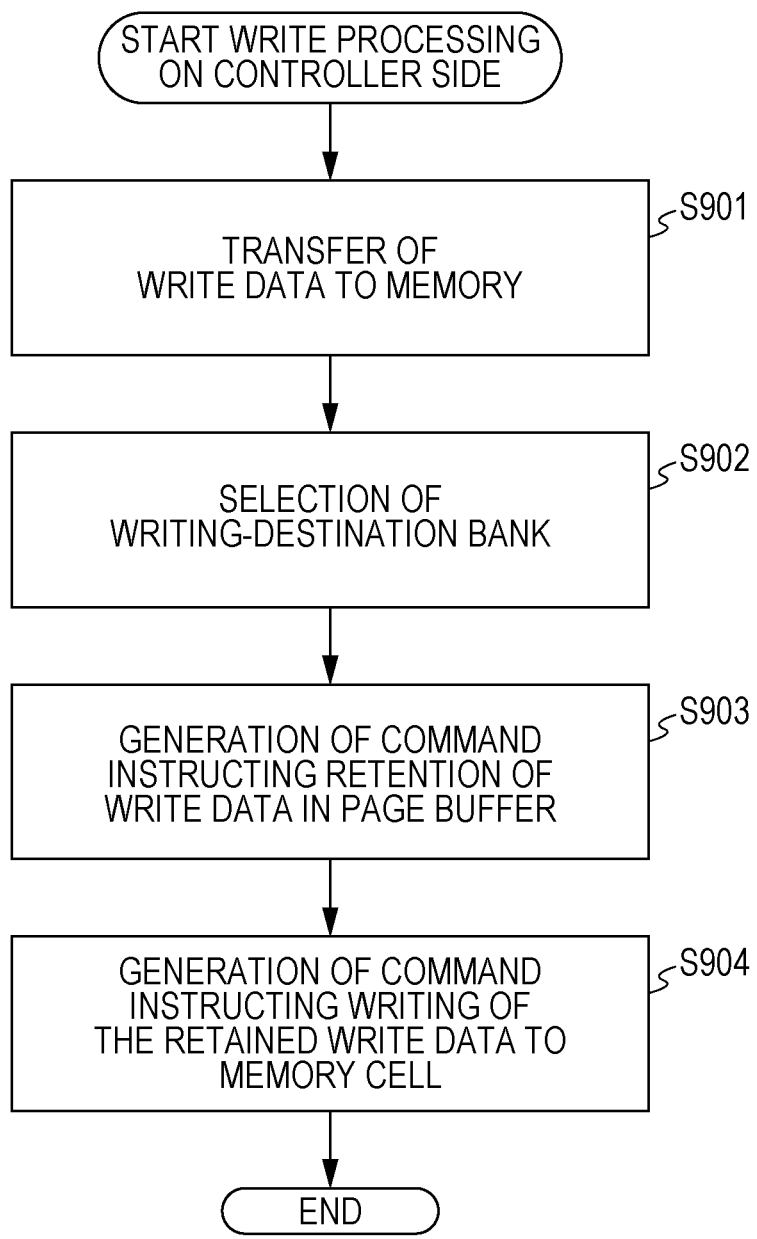
FIG. 7 is a flow chart illustrating one example of write processing on a controller side according to a first embodiment.

FIG. 7 is a flow chart illustrating one example of write processing on a controller side, according to the first embodiment. The write processing on the controller side is started when the writing of the data is instructed by the host computer 100.

The memory controller 200 sequentially transfers the write data to the memory 300 (step S901). In addition, the memory controller 200 selects a writing-destination bank 330 (step S902). Then, the memory controller 200 generates a command DI instructing retention of the write data in the page buffer 332 (step S903). If the write data corresponding to one page is retained, the memory controller 200 generates a command PG instructing the writing of the retained write data to memory cell (step S904). After step S904, the memory controller 200 ends the write processing on the controller side.

Figure 8:
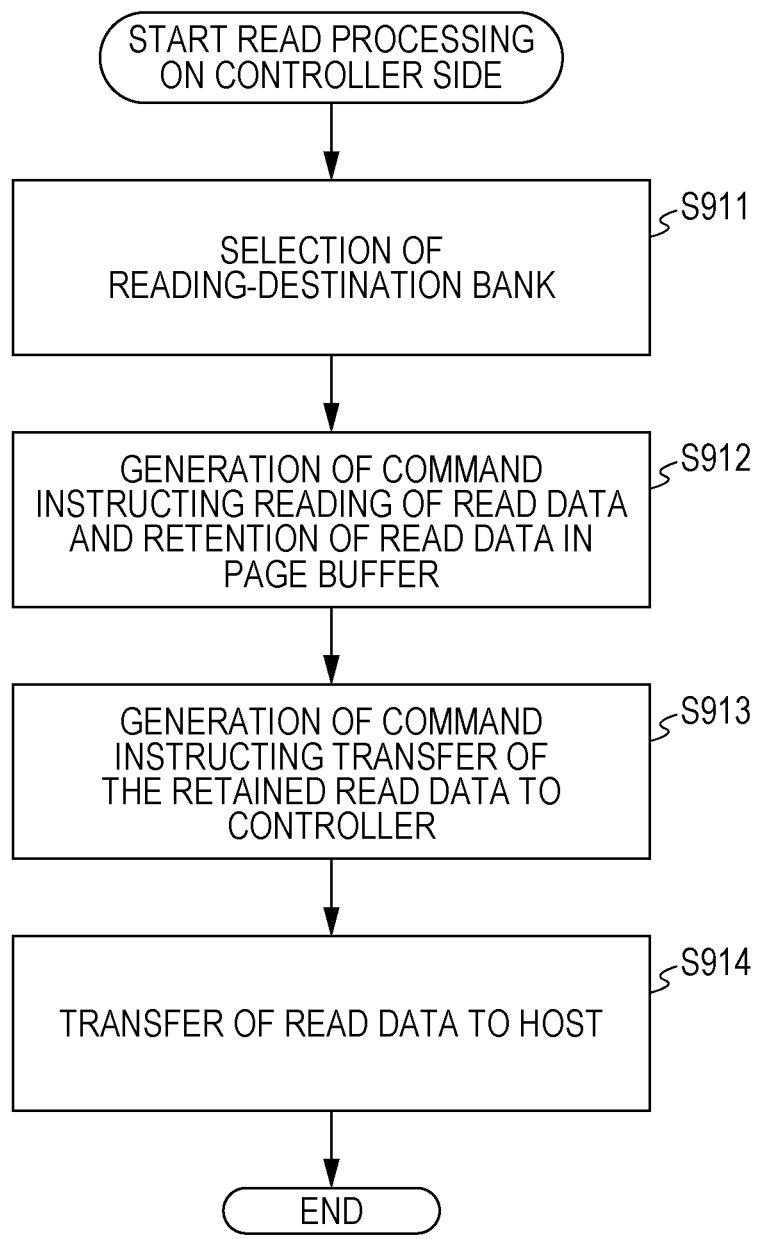
FIG. 8 is a flow chart illustrating one example of read processing on a controller side according to a first embodiment.

FIG. 8 is a flow chart illustrating one example of read processing on the controller side, according to the first embodiment. The read processing on the controller side is started when the reading of the data is instructed by the host computer 100.

The memory controller 200 selects a reading-destination bank 330 (step S911). In addition, the memory controller 200 generates a command SE instructing reading of read data and retention of the read data in the page buffer 332 (step S912). Then, the memory controller 200 generates a command DO instructing transferring of the retained read data to the memory controller 200 (step S913). The memory controller 200 transfers the read data from the memory 300 to the host computer 100 (step S914). After step S914, the memory controller 200 ends the read processing on the controller side.

Figure 9:
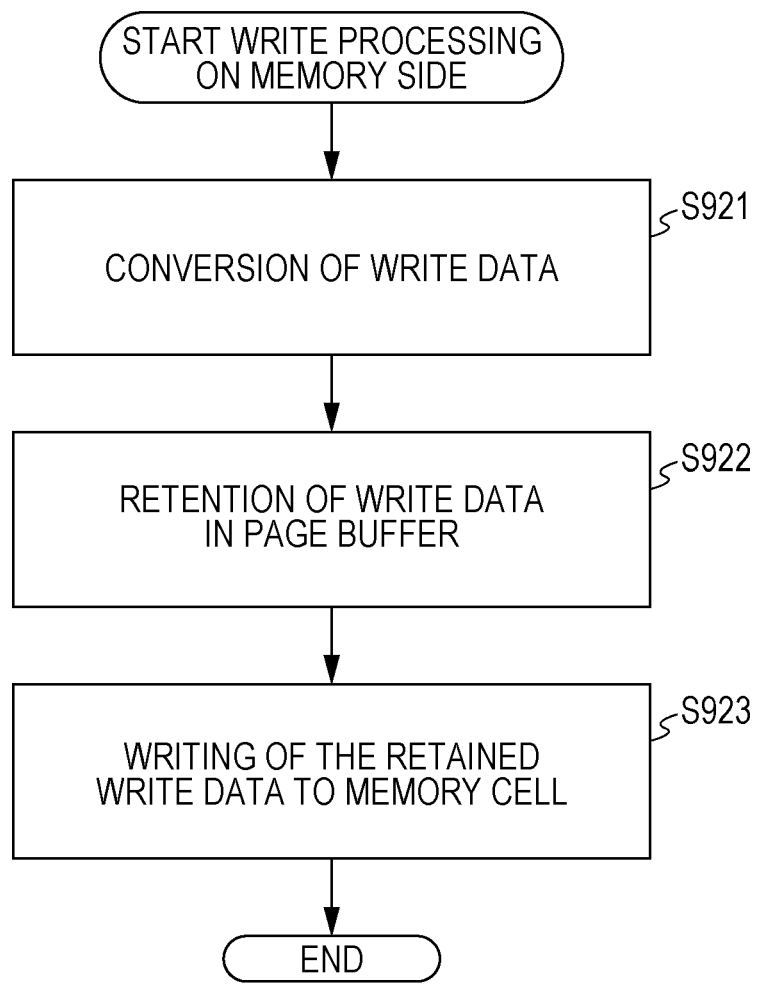
FIG. 9 is a flow chart illustrating one example of write processing on a memory side according to a first embodiment.

FIG. 9 is a flow chart illustrating one example of write processing on a memory side, according to the first embodiment. The write processing on the memory side is started when the write processing on the controller side is implemented.

The memory 300 converts write data of 64 bits from the memory controller 200 into the data of 66 bits (step S921). The memory 300 sequentially retains each piece of the write data in the page buffer 332 (step S922). Then, the memory 300 writes the retained write data to the memory cells by a page unit (step S923). After step S923, the memory 300 ends the write processing on the memory side.

Figure 10:
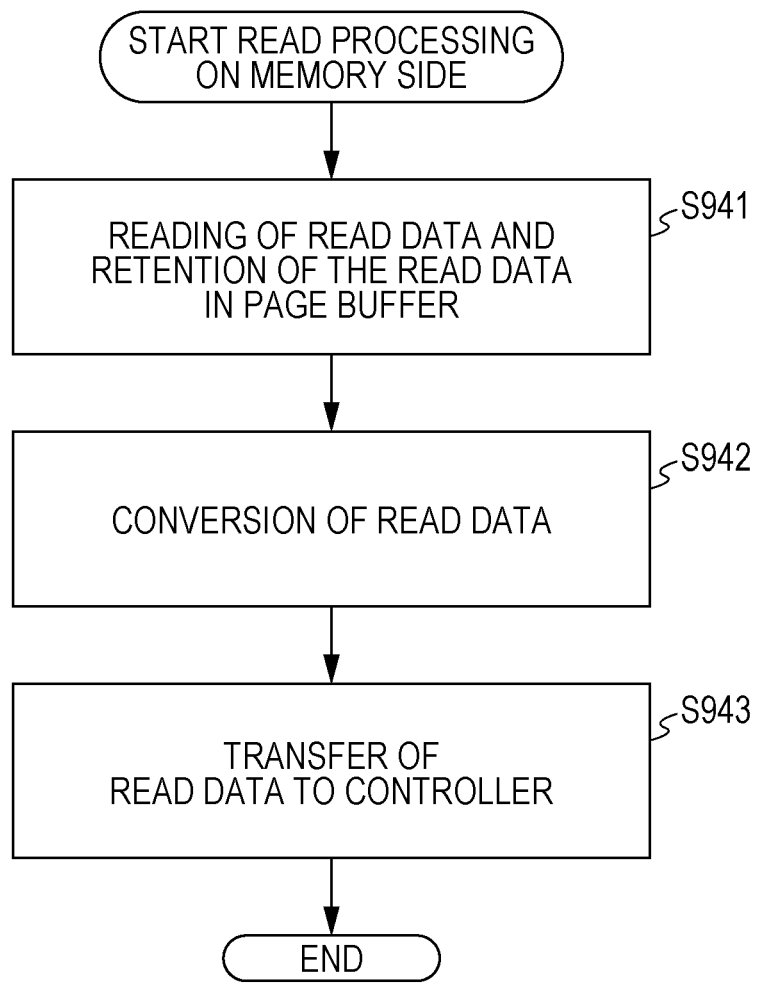
FIG. 10 is a flow chart illustrating one example of read processing on a memory side according to a first embodiment.

FIG. 10 is a flow chart illustrating one example of read processing on the memory side, according to the first embodiment. The read processing on the memory side is started when the read processing on the controller side is implemented.

The memory 300 reads the read data and retains the read data in the page buffer 332 (step S941). Then, the memory 300 converts the read data of 66 bits into the data of 64 bits (step S942). The memory 300 sequentially transfers the converted read data to the memory controller 200 (step S943). After step S943, the memory 300 ends the read processing on the memory side.

In this way, according to the first embodiment of the present disclosure, the memory 300 performs access control during the wait time occurring in the internal data bus with a band width wider than that of the external data bus, and thus, it is possible to prevent the wait time for the access control from occurring in the external data bus. As a result, it is possible to improve transfer efficiency of the data of the memory system. In addition, through the improved transfer efficiency, a transfer time at the time of transferring a constant amount of data is reduced, and current consumption of the memory 300 is reduced.

First Modification Example

In the first embodiment, one shifter 310 is provided with respect to a plurality of banks 330, but the shifter may be provided in each bank 330. A first modification example is different from the first embodiment in that the shifter is provided in each bank 330.

Figure 11:
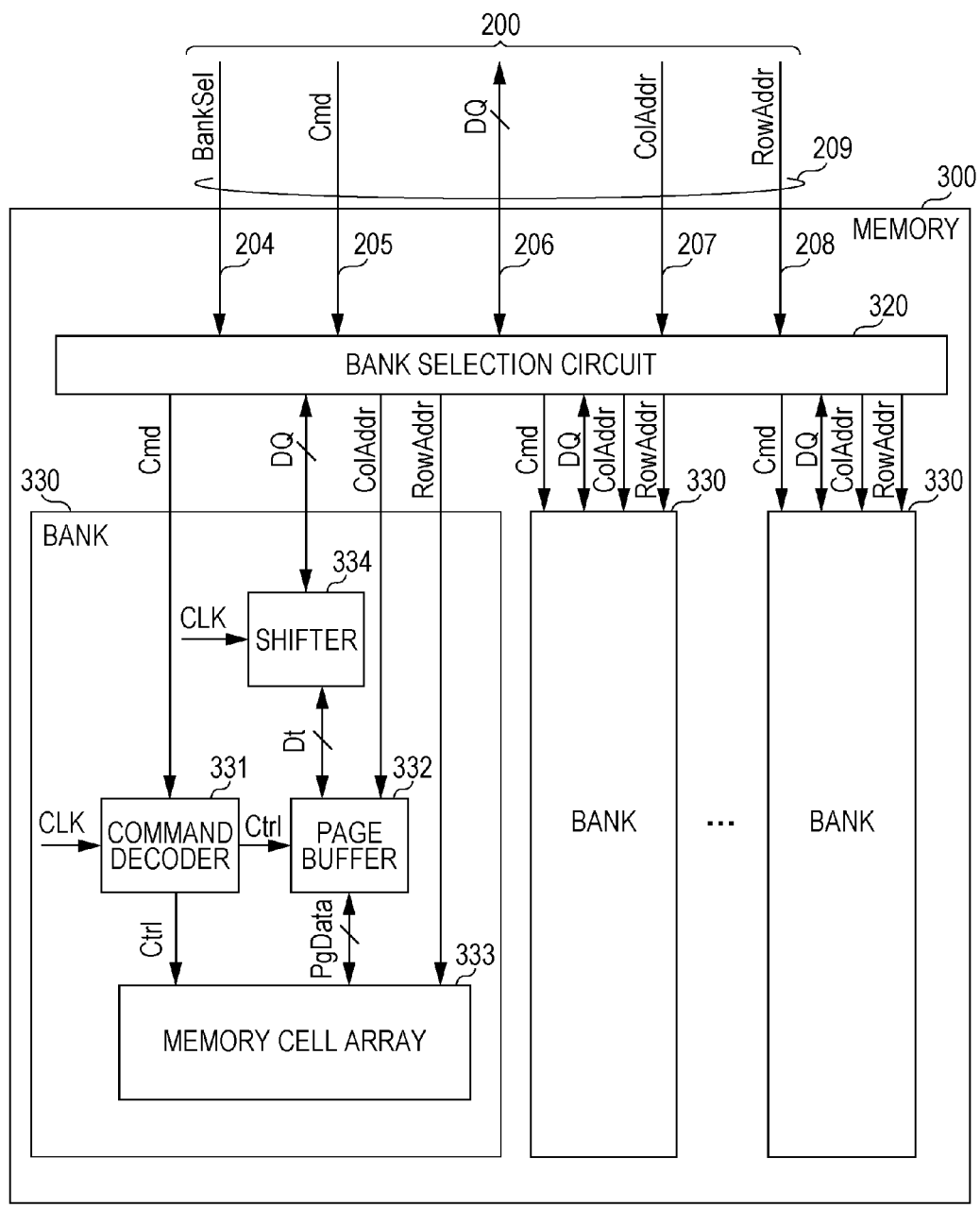
FIG. 11 is a block diagram illustrating one configuration example of a memory according to a first modification example.

FIG. 11 is a block diagram illustrating one configuration example of the memory 300 according to a first modification example. A first modification example is different from the first embodiment in a point that the memory 300 according to the first modification example does not include the shifter 310 which is used in the plurality of banks 330, but includes a shifter 334 in each bank 330.

The shifter 334 in each bank 330 mutually converts the data DQ from the bank selection circuit 320 and the data Dt from the page buffer 332.

In this way, according to the first modification example, the shifter 310 is provided in each bank 330, and thus, it is possible to prevent the wait time from occurring in the data bus between the bank selection circuit 320 and the bank 330.

As a result, the transfer efficiency of the data between the bank selection circuit 320 and the bank 330 is improved.

Second Modification Example

In the first embodiment, the memory controller 200 mutually converts the data serially transferred and the data transferred in parallel, but this conversion may be performed by the memory 300. A second modification example is different from the first embodiment in that the memory 300 according to the second modification example mutually converts the data serially transferred and the data transferred in parallel.

Figure 12:
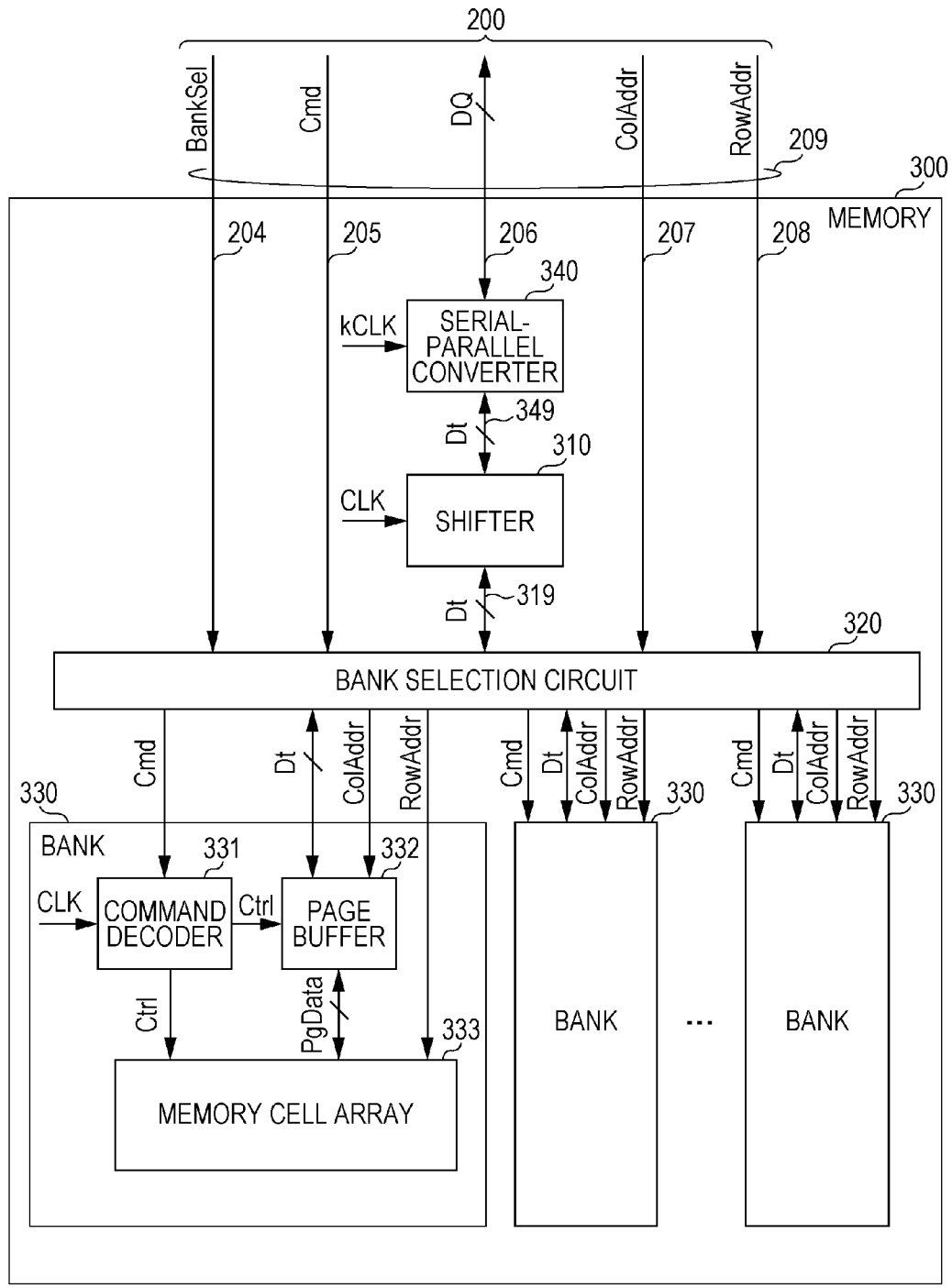
FIG. 12 is a block diagram illustrating one configuration example of a memory according to a second modification example.

FIG. 12 is a block diagram illustrating one configuration example of the memory 300 according to a second modification example. The second modification example is different from the first embodiment in that the memory 300 according to the second modification example further includes a serial-parallel converter 340.

The serial-parallel converter 340 mutually converts the data serially transferred and the data transferred in parallel. The serial-parallel converter 340 transfers the data in parallel to the shifter 310 via a data bus with a bus width of N bits in synchronization with the clock CLK. In addition, the serial-parallel converter 340 serially transfers the data to the memory controller 200 via the external data bus 206 in synchronization with a clock kCLK. Here, the frequency of the clock kCLK is k times the clock CLK. In addition, N is a value to be divided by K, and K is an integer of two or more.

In addition, the serial-parallel converter 340 is an example of the data conversion unit described in the scope of claims.

In this way, according to the second modification example, the memory 300 performs the serial-parallel conversion, and thus, burden of the memory controller 200 is reduced.

2. Second Embodiment

Configuration Example of Memory

In the first embodiment, the memory 300 converts the bus width, and thereby the bus widths of the external data bus 206 and the internal data bus 319 are converted, but the width can also be converted by converting a transfer clock. The second embodiment is different from the first embodiment in that the memory 300 according to the second embodiment converts the transfer clocks of the external data bus 206 and the internal data bus 319.

Figure 13:
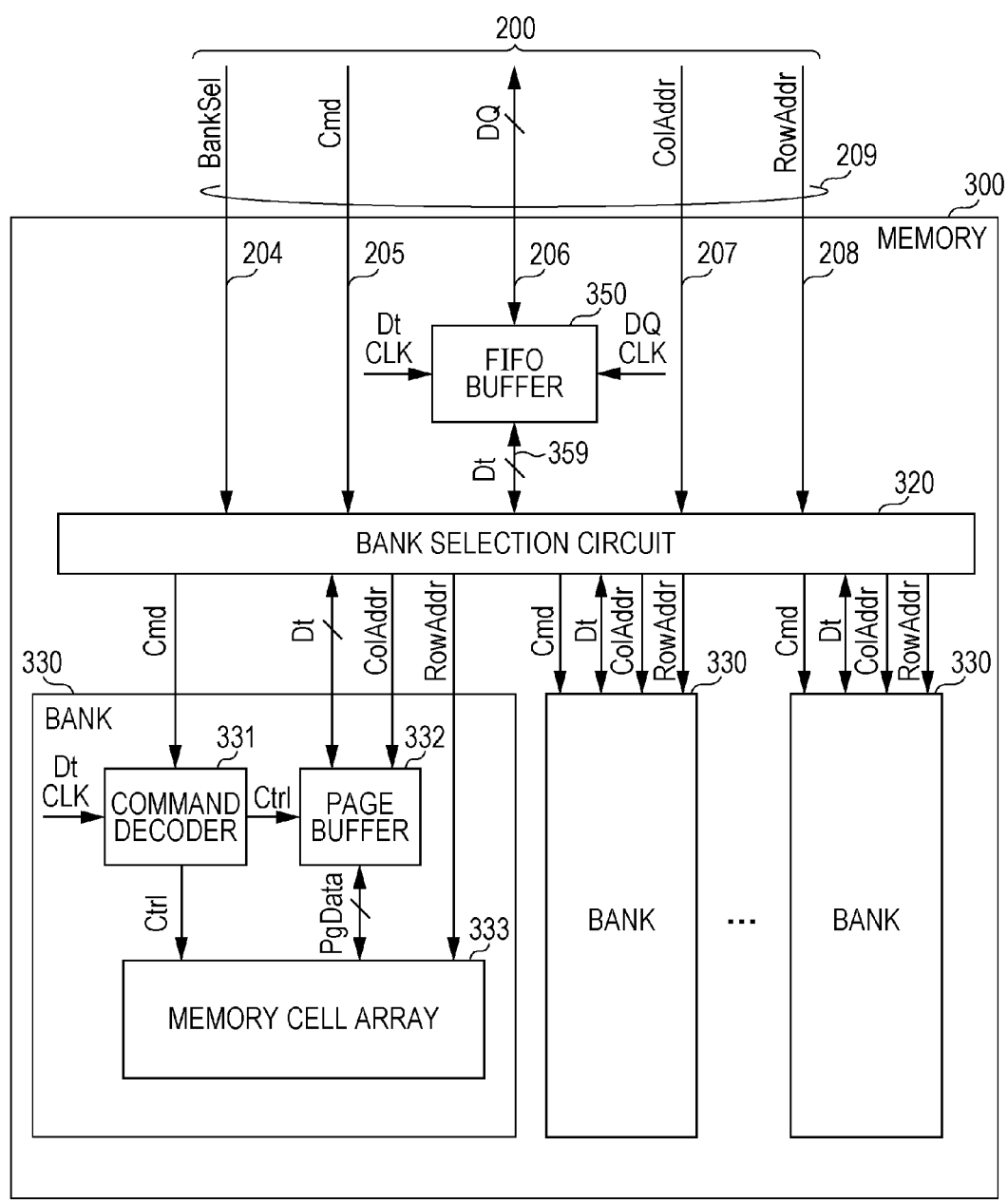
FIG. 13 is a block diagram illustrating one configuration example of a memory according to a second embodiment.

FIG. 13 is a block diagram illustrating one configuration example of the memory 300 according to the second embodiment. The second embodiment is different from the first embodiment in that the memory 300 according to the second embodiment includes a FIFO (First In First Out) buffer 350 instead of the shifter 310.

The FIFO buffer 350 transfers the data by making a transfer clock DtCLK of the internal data bus 319 greater than a transfer clock DQCLK of the external data bus 206. The FIFO buffer 350 includes a circuit which retains and outputs the data using a FIFO method, and transfers the data to the memory controller 200 via the external data bus 206 in synchronization with the transfer clock DQCLK. In addition, the FIFO buffer 350 transfers the data to the bank selection circuit 320, in synchronization with the transfer clock DtCLK with a clock frequency higher than the transfer clock DQCLK. The clock frequency of the transfer clock DtCLK is, for example, 33 megahertz (MHz), and the clock frequency of the transfer clock DQCLK is, for example, 32 megahertz (MHz). The FIFO buffer 350 is an example of the band conversion unit described in the scope of claims.

In addition, in the second embodiment, the bus width of the external data bus 206 and the bus width of the internal data bus 319 are the same as each other.

Operation Example of Memory

Figure 14:
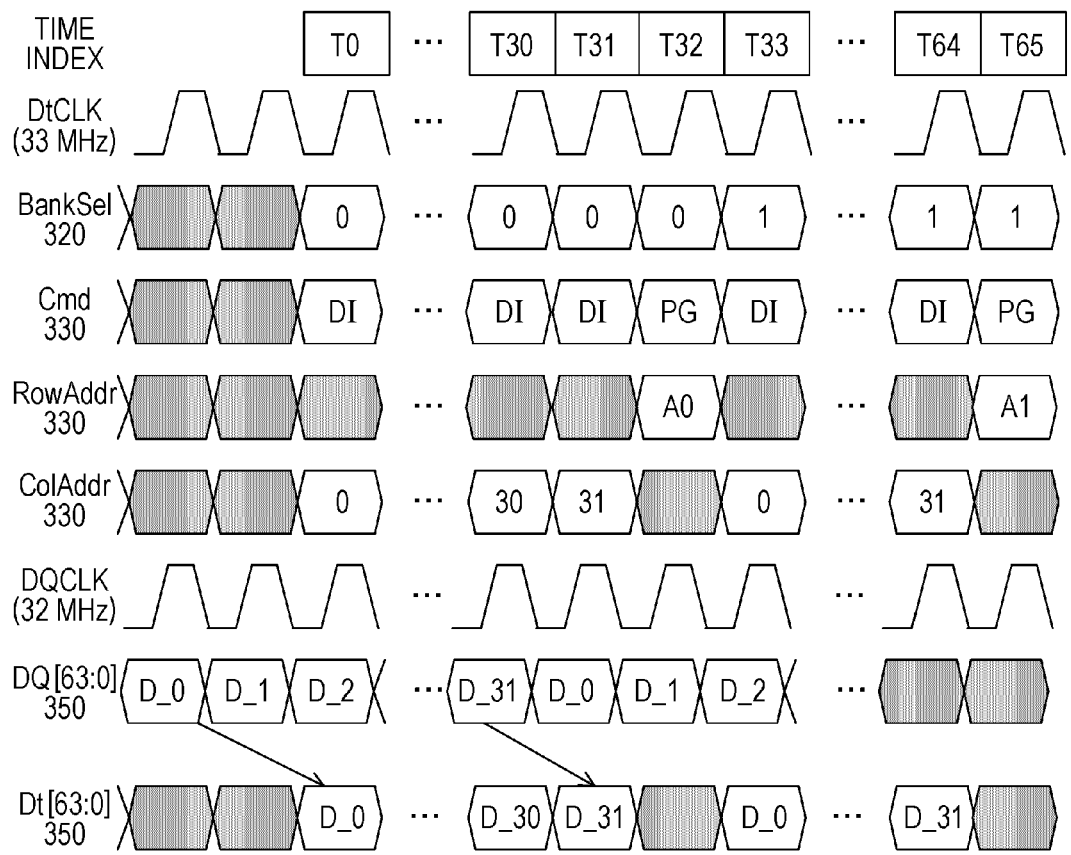
FIG. 14 is a timing chart illustrating one example of write processing according to a second embodiment.

FIG. 14 is a timing chart illustrating one example of write processing according to the second embodiment. The FIFO buffer 350 sequentially receives and retains the data D_0 to D_31 for writing to the memory cells, in synchronization with the transfer clock DQCLK of 32 MHz. Then, the FIFO buffer 350 sequentially supplies the retained data to the page buffer 332, in synchronization with the transfer clock DtCLK of 33 MHz. However, the FIFO buffer 350 provides a wait time corresponding to one clock of the transfer clock DtCLK, each time 32 pieces of data are supplied in synchronization with the transfer clock DtCLK. During the wait time, the bank 330 implements the command of the program PG, and thereby writing to the memory cells is performed.

In this way, the transfer clock of the internal data bus 319 is set to be faster than the transfer clock of the external data bus 206, and thereby it is possible to hide the wait time necessary to implement the program PG so as not to be viewed from the memory controller 200 side.

Figure 15:
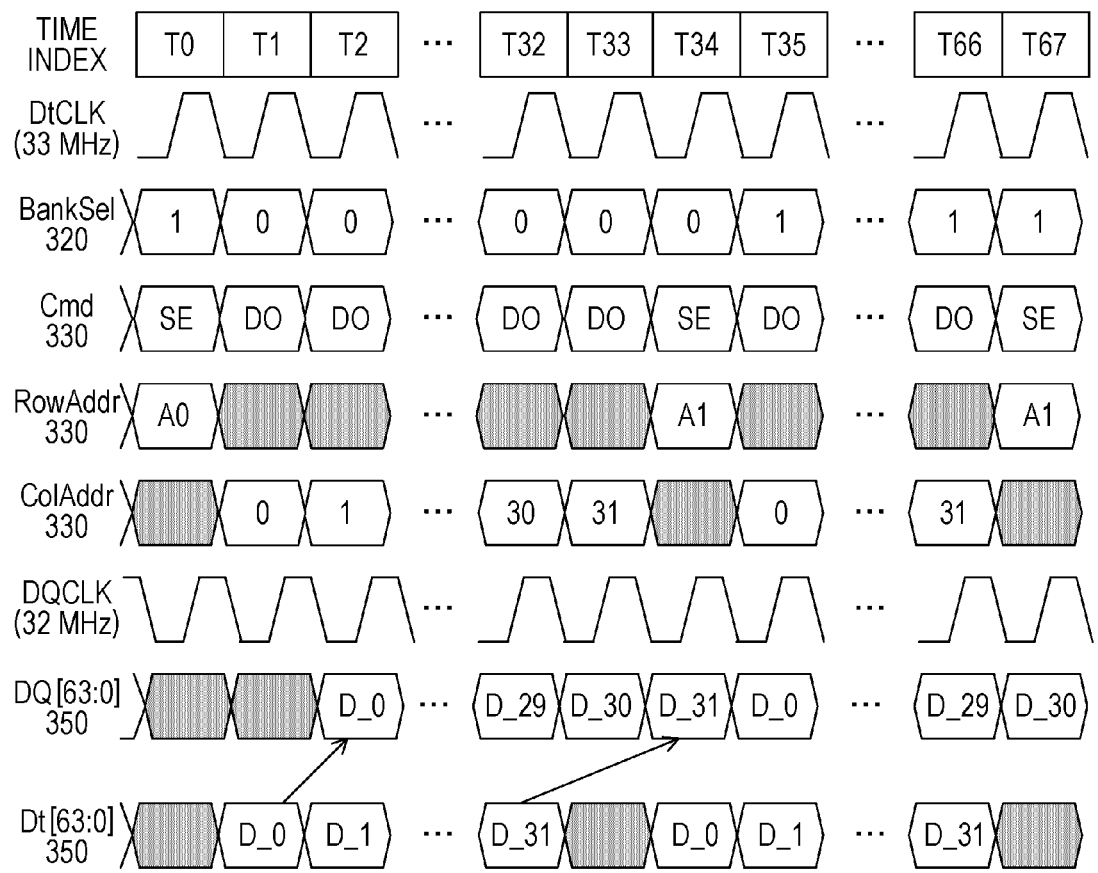
FIG. 15 is a timing chart illustrating one example of read processing according to a second embodiment.

FIG. 15 is a timing chart illustrating one example of read processing according to the second embodiment. The FIFO buffer 350 receives and retains the data D_0 to D_31 read from the memory cells, in synchronization with the transfer clock DQCLK of 33 MHz. Then, the FIFO buffer 350 sequentially supplies the retained data to the memory controller 200, in synchronization with the transfer clock DtCLK of 32 MHz. However, the FIFO buffer 350 provides a wait time corresponding to one clock of the transfer clock DtCLK, each time 32 pieces of data are retained in synchronization with the transfer clock DtCLK. During the wait time, the bank 330 implements the command of the sense SE, and thereby reading from the memory cells is performed.

As illustrated in FIG. 15, the transfer clock of the internal data bus 319 is set to be faster than the transfer clock of the external data bus 206, and thereby it is possible to hide the wait time necessary to implement the sense SE so as not to be viewed from the memory controller 200 side.

In this way, according to the second embodiment, the memory 300 performs access control during the wait time occurring in the internal data bus with the transfer clock faster than that of the external data bus, and thus, it is possible to prevent the wait time for the access control from occurring in the external data bus. As a result, it is possible to improve the transfer efficiency of the data of the memory system.

In addition, the above-described embodiments are just examples for specifying the present disclosure, and have corresponding relationships with matters of the embodiments and special matters of the scope of claims, respectively. Similarly, the above-described embodiments have corresponding relationships with the special matters of the scope of claims and matters of the embodiments of the present disclosure to which the same names as the special matters are given, respectively. However, the present disclosure is not limited to the present embodiments, and can be realized by various modifications of embodiments, within a range not departing from gist thereof.

In addition, a processing sequence described in the above-described embodiments may be provided as a method having such a series of sequences, and in addition, such a series of sequences may be provided as a program for being implemented in a computer and as a recording medium in which the program is recorded. For example, a CD (compact disc), an MD (MiniDisc), a DVD (Digital Versatile Disc), a memory card, a Blu-ray (registered trademark) disc, or the like can be used as the recording medium.

In addition, the effects described herein are not limited necessarily, and may be one of the effects described in the present disclosure.

In addition, the present disclosure can also employ the following configurations.

(1) A memory including: a buffer which retains data; a band conversion unit which converts a band of an internal data bus that is used for data transfer between the band conversion unit and the buffer into a band wider than that of an external data bus that is used for data transfer between the band conversion unit and a memory controller; and an access control unit which controls access to a memory cell using the buffer, during a wait time occurring in the internal data bus due to a difference between the band of the internal data bus and the band of the external data bus.

(2) The memory described in (1) in which a data bus is used as the internal data bus and the external data bus, and in which the band conversion unit converts a bus width of the data bus which is used as the internal data bus into a value wider than that of a bus width of the data bus which is used as the external data bus.

(3) The memory described in (1) in which the band conversion unit converts a transfer clock of the data on the internal data bus into a clock faster than a transfer clock of the data on the external data bus.

(4) The memory described in any one of (1) to (3) further including: a data conversion unit which mutually converts data that is serially transferred on the external data bus and data that is transferred in parallel on the external internal data bus, and in which the memory controller serially transfers data to the data conversion unit, and in which the band conversion unit transfers data in parallel to the data conversion unit.

(5) A memory system including: a memory controller; a buffer which retains data; a band conversion unit which converts a band of an internal data bus that is used for data transfer between the band conversion unit and the buffer into a band wider than that of an external data bus that is used for data transfer between the band conversion unit and the memory controller; and an access control unit which controls access to a memory cell using the buffer, during a wait time occurring in the internal data bus due to a difference between the band of the internal data bus and the band of the external data bus.

(6) A memory control method including: converting a band of an internal data bus which is used for data transfer between the band conversion unit and a buffer which retains data into a band wider than that of an external data bus which is used for data transfer between the band conversion unit and a memory controller; and controlling access to a memory cell using the buffer, during a wait time occurring in the internal data bus due to a difference between the band of the internal data bus and the band of the external data bus It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A memory comprising:
   a buffer that retains data;
   a bandwidth conversion unit which converts a bandwidth of an internal data bus that is used for data transfer between the bandwidth conversion unit and the buffer into a bandwidth wider than that of an external data bus that is used for data transfer between the bandwidth conversion unit and a memory controller;
   an access control unit that controls access to a memory cell using the buffer, during a wait time occurring in the internal data bus;
   a data conversion unit that mutually converts data that is serially transferred on the external data bus and data that is transferred in parallel on the internal data bus;
   wherein the memory controller serially transfers data to the data conversion unit;
   wherein the bandwidth conversion unit transfers data in parallel to buffer; and
   wherein the bandwidth of the internal data bus is different from the bandwidth of the external data bus.

2. The memory according to claim 1, wherein a data bus is used as the internal data bus and the external data bus, and
   wherein the bandwidth conversion unit converts a bus width of the data bus which is used as the internal data bus into a value wider than that of a bus width of the data bus which is used as the external data bus.

3. The memory according to claim 1,
   wherein the bandwidth conversion unit is configured to convert a transfer clock of the data on the internal data bus into a clock faster than a transfer clock of the data on the external data bus.

4. The memory according to claim 1,
   wherein the bandwidth conversion unit is connected with a bank selection circuit through the internal data bus.

5. A memory system comprising:
   a memory controller;
   a buffer that retains data;
   a bandwidth conversion unit which converts a bandwidth of an internal data bus that is used for data transfer between the bandwidth conversion unit and the buffer into a bandwidth wider than that of an external data bus that is used for data transfer between the bandwidth conversion unit and the memory controller;
   an access control unit that controls access to a memory cell using the buffer, during a wait time occurring in the internal data bus;
   a data conversion unit that mutually converts data that is serially transferred on the external data bus and data that is transferred in parallel on the internal data bus;
   wherein the memory controller serially transfers data to the data conversion unit;
   wherein the bandwidth conversion unit transfers data in parallel to buffer; and
   wherein the bandwidth of the internal data bus is different from the bandwidth of the external data bus.

6. The memory system according to claim 5,
   wherein a data bus is used as the internal data bus and the external data bus, and
   wherein the bandwidth conversion unit converts a bus width of the data bus which is used as the internal data bus into a value wider than that of a bus width of the data bus which is used as the external data bus.

7. The memory system according to claim 5,
   wherein the bandwidth conversion unit is configured to convert a transfer clock of the data on the internal data bus into a clock faster than a transfer clock of the data on the external data bus.

8. The memory system according to claim 5,
   wherein the bandwidth conversion unit is connected with a bank selection circuit through the internal data bus.

9. A memory control method comprising:
   converting by a bandwidth conversion unit a bandwidth of an internal data bus which is used for data transfer between a bandwidth conversion unit and a buffer which retains data into a bandwidth wider than that of an external data bus which is used for data transfer between the bandwidth conversion unit and a memory controller; and
   controlling access to a memory cell using the buffer, during a wait time occurring in the internal data bus;
   mutually converting data that is serially transferred on the external data bus and converting data that is transferred in parallel on the internal data bus by a data conversion unit;
   wherein the memory controller serially transfers data to the data conversion unit;
   wherein the bandwidth conversion unit transfers data in parallel to buffer; and
   wherein the bandwidth of the internal data bus is different from the bandwidth of the external data bus.

* * * * *